(No Model.)　　　　　　　　　　　　　　　　2 Sheets—Sheet 1.
R. KENT.
APPARATUS FOR SOLDERING SHEET METAL CANS.
No. 249,243.　　　　　　　　　　　Patented Nov. 8, 1881.
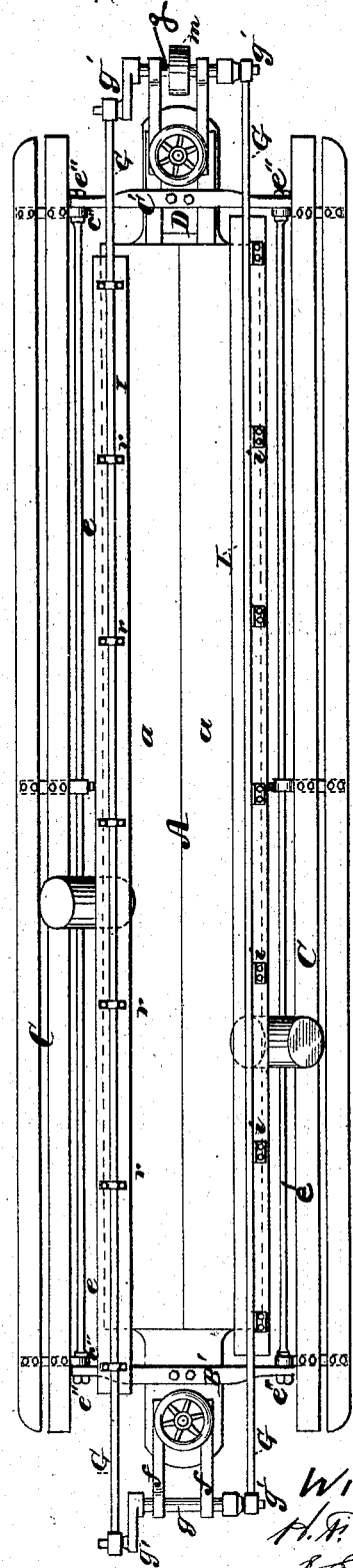
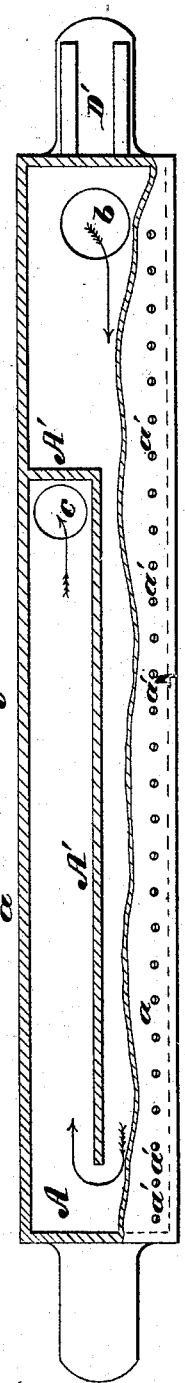
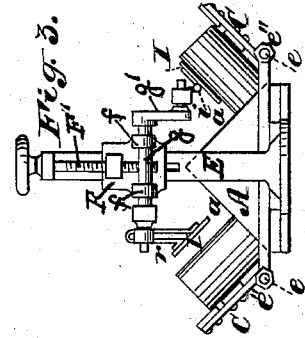
WITNESSES.
H. A. Parker.
J. E. Foch
INVENTOR.
Robert Kent.
per James A. Whitney
Att'y.
N. PETERS. Photo-Lithographer, Washington, D. C.

(No Model.)
2 Sheets—Sheet 2.
R. KENT.
APPARATUS FOR SOLDERING SHEET METAL CANS.
No. 249,243. Patented Nov. 8, 1881.
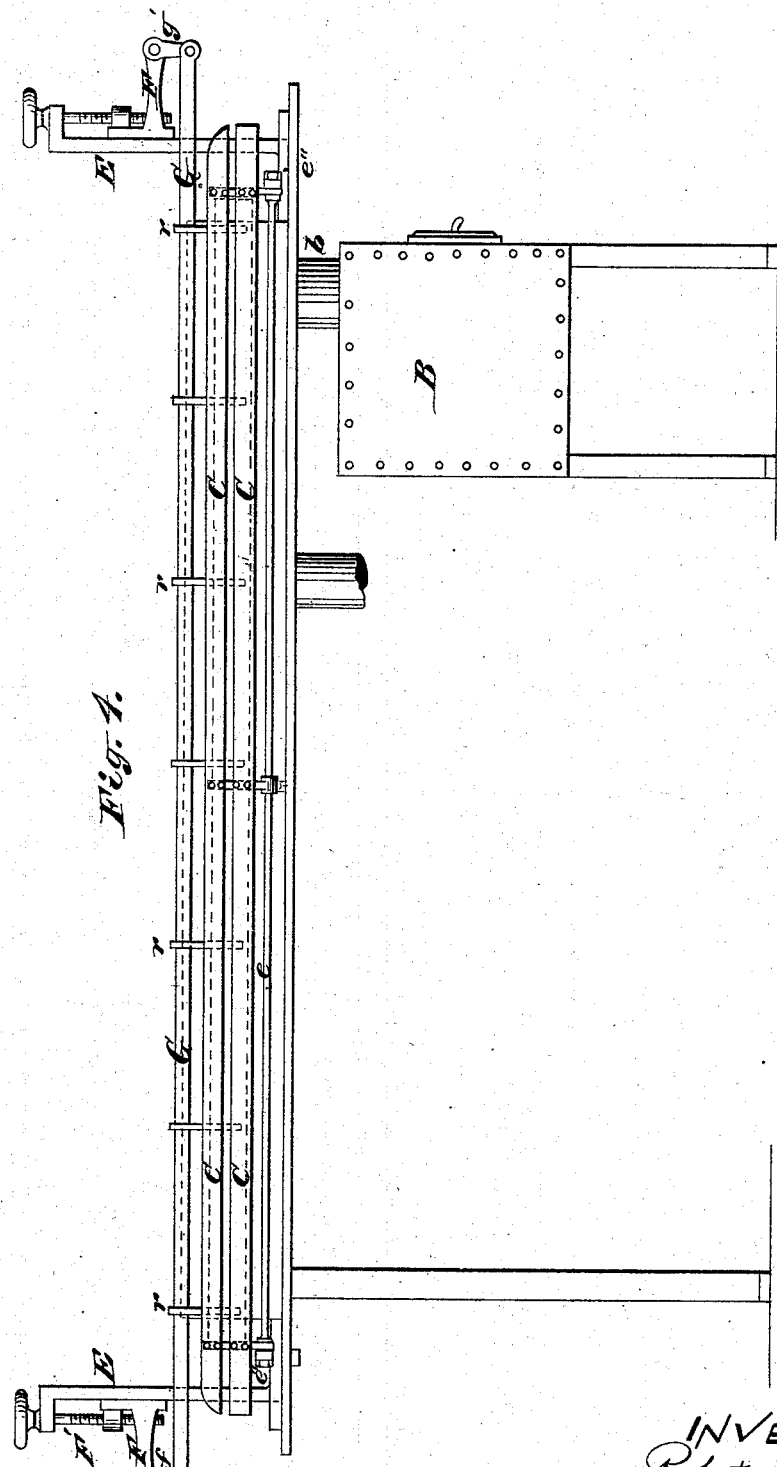

UNITED STATES PATENT OFFICE.

ROBERT KENT, OF BROOKLYN, NEW YORK.

APPARATUS FOR SOLDERING SHEET-METAL CANS.

SPECIFICATION forming part of Letters Patent No. 249,243, dated November 8, 1881.

Application filed July 12, 1880. (No model.)

*To all whom it may concern:*

Be it known that I, ROBERT KENT, of Brooklyn, in the county of Kings and State of New York, have invented certain Improvements in Apparatus for Soldering Sheet-Metal Cans, of which the following is a specification.

This invention relates to that class of apparatus for soldering sheet-metal cans in which the solder is placed within the can and the can rolled along a suitable guide in contact with the face of a heater in such manner that the solder is melted and caused to flow into and seal the circumferential seam between the end of the can and the body thereof.

My present invention comprises certain novel combinations of parts for insuring the requisite rolling or rotatory movement of the cans along the guides and in contact with the heater; also, for insuring a quicker and more effective action of the solder than has hitherto been secured; also, for preventing injury to the machine itself from the expansion and contraction of its parts from changes of temperature.

Figure 1 is a plan view of an apparatus constructed according to my said invention. Fig. 2 is a plan view and partial horizontal section of the heater which forms part of said apparatus. Fig. 3 is an end view, and Fig. 4 a side elevation, of said apparatus.

In practice the machine should be made with duplicate parts, as hereinafter explained, in order that the greatest working capacity may be secured. The invention may, however, be carried into effect without this duplication of parts. Thus, for example, instead of having a heater with two faces and two distinct sets of mechanism for rotating the cans, the apparatus may be made with only one heating-face and only one set of devices for insuring the rolling of the cans in contact with said face.

A is the heater, the two heating-faces of which are shown at *a*, their relative position being more clearly indicated in Fig. 3. Each of these faces is perforated with numerous small holes, $a'$. This heater A is hollow, and is provided with an internal partition, $A'$. Said heater A is connected with a stove or furnace, B, by means of a suitable pipe or passage, $b$, which forms the inlet of the heater A, the outlet *c* of said heater being situated at the opposite end of the channel within the said heater by the partition $A'$, as represented in Fig. 2.

The heater A is heated by the hot gaseous products of combustion from the furnace B, which, by means of the partition $A'$, are caused to traverse in contact with the inner surfaces of the walls of the faces *a*, the greatest portion of said products of combustion escaping from the outlet *c*, although a sufficient proportion of said hot gaseous products of combustion pass out through the perforations $a'$, to increase the heating action upon the cans during the soldering operation, as hereinafter explained.

Placed adjacent to each of the faces A is a rest or guide, C, the office of which is to support the cans while they are rolling with their ends against or substantially in contact with the adjacent face *a*. Each of these guides C is hinged or pivoted at its lower edge to a longitudinal rod, *e*. These rods *e* are attached at their ends to two cross-bars, $B'$ and $C'$, the cross-bar $B'$ being rigidly fixed to one end of the heater A, while the other, $C'$, of said cross-bars is attached to a block, D, which slides between ways $D'$ at the opposite end of the heater. By this means the expansion and contraction of the heater A by changes of temperature is prevented from injuring the rods *e* and guide C, which are comparatively little exposed to such changes of temperature.

The rods *e* are provided with nuts $e''$, by means of which the cross-bars $B'$ and $C'$ may be so snugly drawn in contact with the hinges $e''$ of the guide C that the frictional contact will be sufficient to hold the guide C in a fixed position at any desired angles to the faces *a* of the heater A.

At each end of the heater are fixed vertical standards E, which are so constructed as to receive vertically-movable carrier-blocks F, which are vertically adjusted by means of screws $F'$. Each of these carrier-blocks F has two outwardly-extending arms, *f*, which afford bearings for double-crank shafts *g*, each of said crank-shafts *g* having a crank, $g'$, at each end. The two cranks $g'$ at each side of the apparatus are connected by rods G, from which are suspended floats I, said floats being attached to the rods G by hinges *i*, as represented in Figs. 1 and 3, so that the floats, when depressed by the downward movement of the cranks from which they are suspended, will rest upon the upper surfaces of the cans, and in a position parallel therewith, as represented on the right-hand side of Fig. 3, and also so that when lifted by the upward movement of the said crank they will be brought away from the surface of the can, as represented on the left-hand side of Fig. 3. When preferred, the floats may be suspended from the rods G by loops, as represented in the left-hand portion of Fig. 3, the top portion of Fig. 1, and also in Fig. 4, the said loops being represented by the reference-letter $r$. The crank-shafts being simultaneously revolved—as, for example, by a band running to a pulley, $m$, on one of the said crank-shafts—the floats are moved alternately downward and forward in one direction and upward and backward in the reverse direction, so that the cans, with a suitable quantity of solder inside them, being placed upon the guide C, with their ends to be soldered resting substantially in contact with the adjacent faces $a$ of the heater A, are subjected to a series of successive impulses upon the uppermost parts of their circumference, which causes them to roll or rotate along the guide C, with their inner ends in substantial contact with the faces $a$ of the heater A, and with the hot gaseous products of combustion which issue through the perforations $a'$, as hereinbefore explained. By this means the solder previously placed within the cans is melted, and, as the cans are caused to rotate from one end of the guide C to the other, is caused to flow into and seal the joints to be soldered. The melting and flowing of the solder is very materially assisted by the direct action upon the ends of the cans of the hot gaseous products of combustion issuing through the perforations $a'$, as just explained.

Inasmuch as I have now pending before the Patent Office another application for a patent on apparatus for soldering sheet-metal cans which was filed on or about May 17, A. D. 1880, I hereby, for the purposes of this present application B, disclaim those combinations of parts which are claimed in said application filed on or about May 17, A. D. 1880, as aforesaid.

What I in this present application B claim as my invention is—

1. In an apparatus for soldering cans, the combination of one or more guides and one or more movable floats with a heater having one or more heating-faces, all substantially as and for the purpose herein set forth.

2. In an apparatus for soldering cans, a heater having one or more perforated heating-faces, in combination with one or more guides for holding the cans while rotated substantially in contact with said perforated face or faces, all substantially as and for the purpose herein set forth.

3. In an apparatus for soldering cans, the combination of two or more cranks, $g'$, one or more floats, I, one or more guides, C, and a heater having one or more heating-faces, $a$, all substantially as and for the purpose herein set forth.

4. In an apparatus for soldering cans, the combination of the standards E, carrier-blocks F, adjusting-screws F', two or more cranks, $g'$, one or more floats, I, one or more guides, C, and a heater having one or more heating-surfaces, A, all substantially as and for the purpose herein set forth.

5. In an apparatus for soldering cans, the combination of a heater constructed with the internal partition, A', heating-faces $a$, guide C, and mechanism, substantially as described, for rotating the cans, all substantially as and for the purpose herein set forth.

6. In an apparatus for soldering cans, the combination of the rigidly-fastened cross-bars B' C', sliding block D, rod $e$, heater A, ways D', and guide C, all substantially as and for the purpose herein set forth.

ROBERT KENT.

Witnesses:
JAMES A. WHITNEY,
ROBERT H. GRIFFIN.